United States Patent [19]

Ferris

[11] Patent Number: 4,777,828
[45] Date of Patent: Oct. 18, 1988

[54] REMOVABLE, IN-PLACE REFRIGERANT PRESSURE CHECK GAUGE

[76] Inventor: James E. Ferris, 15 High Mesa Pl., Richardson, Tex. 75080

[21] Appl. No.: 80,758

[22] Filed: Aug. 3, 1987

Related U.S. Application Data

[63] Continuation-in-part of Ser. No. 873,386, Jun. 12, 1986, Pat. No. 4,693,112.

[51] Int. Cl.$^4$ .............................................. G01L 7/16
[52] U.S. Cl. .................... 73/744; 73/146.8; 73/756; 116/272
[58] Field of Search ............... 73/744, 714, 715, 729, 73/146.8, 146.2, 756; 137/227, 229; 116/34 R, 272

[56] References Cited

U.S. PATENT DOCUMENTS

| 988,917 | 4/1911 | Walker | 73/146.8 |
| 2,160,414 | 4/1937 | Eksergian et al. | 73/146.8 |
| 3,696,668 | 10/1972 | Patrick | 73/146.8 |
| 3,824,849 | 7/1974 | Foxhall | 73/146.8 |
| 4,028,936 | 6/1977 | Guy | 73/146.8 |

FOREIGN PATENT DOCUMENTS

| 372944 | 4/1902 | France | 73/756 |
| 1349402 | 12/1963 | France | 73/146.8 |
| 1024765 | 6/1983 | U.S.S.R. | 73/146.8 |

*Primary Examiner*—Donald O. Woodiel
*Attorney, Agent, or Firm*—Hubbard, Thurman, Turner & Tucker

[57] ABSTRACT

A removable, in-place pressure check gauge connectable to the normally closed low pressure test and service valve fitting in the refrigerant circuit of a car air conditioning system has a hollow cylindrical body with first and second open opposite ends. The first end has secured thereto a connection fitting that may be threaded onto the test and service valve, and functions to hold the valve in an open position to admit pressurized refrigerant into the gauge body. The refrigerant exerts a pressure force on a seal element supported for axial movement within the body against the biasing force of a compression spring therein. Pressure-caused movement of the seal element toward the second body end is operative to move an elongated pressure indicating rod from a retracted position within the body outwardly through the second body end to an extended position indicative of the refrigerant pressure. Visual determination of the refrigerant pressure is facilitated by numerical pressure markings and color-coded pressure zone indicia formed on the pressure indicating rod and corresponding to similar pressure indicia on the exterior of the gauge body. After the refrigerant pressure reading has been taken in this manner the indicating rod is manually pushed back into the gauge body and the closure cap is replaced to reseal the second body end and retain the indicating rod in its retracted position within the gauge body.

25 Claims, 3 Drawing Sheets

REMOVABLE, IN-PLACE REFRIGERANT PRESSURE CHECK GAUGE

CROSS-REFERENCE TO RELATED APPLICATION

This application is a continuation-in-part of my copending U.S. application Ser. No. 873,386 filed on June 12, 1986, now U.S. Pat. No. 4,693,112.

BACKGROUND OF THE INVENTION

The present invention relates generally to gas pressure gauges, and more particularly provides a removable, in-place refrigerant pressure check gauge connectable to the low pressure test and service valve fitting on an automobile air conditioning refrigerant circuit.

It is well known that the refrigerant pressure in automobile air conditioning systems must be periodically checked to assure that the refrigerant circuit is properly charged to provide adequate operation of the air conditioning system. In the past, such periodic checking of the refrigerant pressure has been accomplished by temporarily connecting a suitable gauge device to the low pressure test and service valve fitting in the refrigerant circuit, and then removing and storing the gauge device for later use as necessary. Because of the compactness of the modern car air conditioning system, and the proximity of its various components to various engine parts, this conventional refrigerant pressure testing method is often a somewhat awkward and cumbersome task requiring, in many instances, a considerable degree of manual dexterity in temporarily connecting the pressure check gauge to the refrigerant service valve within the crowded engine compartment.

One type of conventional pressure check gauge has the general appearance of a "pop-out" tire pressure gauge having an elongated body provided at one end with a temporary connection fitting which must be pressed onto and held against the test and service valve fitting, and an elongated indicator rod housed within the body which is forced outwardly through the opposite body end by refrigerant pressure, the extent to which the rod is forced outwardly from the body being indicative of the refrigerant pressure being tested.

Another conventional form of the pressure check device comprises a cylindrical pressure gauge having a flexible pressure inlet hose secured thereto and having a service valve connection fitting at its outer end which is adapted to be forced onto and temporarily held against the test and service valve to generate a pressure reading on the gauge.

These and other similar conventional pressure check devices, in addition to the difficulty often encountered in temporarily connecting them to the test and service valve, are also easily misplaced when remotely stored during the interim between periodic refrigerant pressure checks.

It is accordingly an object of the present invention to provide a refrigerant pressure check device which eliminates or minimizes above-mentioned and other problems and limitations typically associated with conventional refrigerant pressure check devices.

SUMMARY OF THE INVENTION

In carrying out principles of the present invention, in accordance with a preferred embodiment thereof, a removable, in-place pressure check gauge is provided which includes a hollow cylindrical body having first and second opposite ends. Secured to the first end are connection means for removably connecting the first end to the normally closed low pressure test and service valve fitting in the refrigerant circuit of an automobile air conditioning system. When operatively secured to the service valve fitting, these connection means function to hold the valve in an open position to thereby permit pressurized refrigerant to enter the gauge body through its first end. Pressure of the refrigerant entering the body is exerted against a first end surface of a cylindrical seal element slidably supported within the body for pressure-caused movement toward the second body end against the biasing force of a compression spring housed within the body, the opposite ends of the spring respectively bearing against the seal element and an internally flanged portion of the body positioned adjacent its second end.

A pressure indicating rod member is coaxially disposed within the body and circumscribed by the compression spring. An inner end of the rod is positioned to be engaged by the seal element as it is moved by refrigerant pressure toward the second body end. The movement of the seal element in this manner drives the pressure indicating rod outwardly through the second body end to an extent indicative of the refrigerant pressure being tested. From this pressure-extended position, the indicating rod may be manually pushed back into the gauge body, against the refrigerant pressure force on the seal element, to a retracted position within the body. Closure means, in the form of a threaded cap member carrying a seal member therein, are connectable to the second body end to seal such end against refrigerant leakage therethrough, and to retain the pressure indicating rod in its retracted position within the gauge body.

In operation, with the closure cap sealingly connected to the second end of the gauge body, the connecting means on the first body end are operatively secured to the service valve fitting to thereby operatively mount the pressure check device on the refrigerant system and to hold the service valve in an open position so that refrigerant pressure is continuously exerted against the spring-biased seal element within the gauge body. The pressure check gauge may then conveniently be left in place on the air conditioning system until it becomes necessary to check the refrigerant pressure.

When it is desired to check such pressure, the closure cap is simply unscrewed and removed, at which point the refrigerant pressure within the gauge body forces the pressure indicating rod outwardly through the now open second body end to give a rapid visual indication of the refrigerant pressure. The pressure indicator rod, which is preferably of a rectangular cross-section, has suitably imprinted along various side surfaces thereof numerical refrigerant pressure level indicia (in psi) and color-keyed pressure operating zone markings which are conveniently coordinated with similar numerical pressure indicia and color keyed operating zone markings formed on a suitable label affixed to the exterior of the gauge body. By observing the location at which the second body end crosses either the numerical pressure markings or the colored operating pressure zones visible on the pressure indicating rod in its extended position, and comparing either or both such locations to corresponding locations on the body label, the actual refrigerant pressure and other operating information may be rapidly ascertained.

When the pressure reading has been taken, the pressure indicating rod is simply manually pushed back into its retracted position within the gauge body and the closure cap is screwed back onto the second body and to reseal such end and to retain the indicating rod in its retracted position within the gauge body.

As previously mentioned, the pressure check gauge may then be left in place on the service valve fitting until it is necessary to check the refrigerant pressure again. In the event that the gauge indicates that the refrigerant pressure is insufficient, the connection means on the first end of the gauge body may be disconnected from the service valve fitting and an appropriate additional charge of refrigerant added to the circuit therethrough. The pressure check gauge may then be reconnected to the service valve fitting and left in place until a subsequent check of the refrigerant pressure is desired.

In one embodiment of the pressure check gauge the connection means used to secure the gauge body to the test and service valve fitting comprise a hollow cylindrical, internally threaded connection member which is coaxially and fixedly secured to the first end of the gauge body. Accordingly, when the body is connected to the valve fitting it is coaxial therewith. In an alternate embodiment of the pressure check gauge the connection means comprise an angled swivel connection fitting which connects the gauge body to the valve fitting at a 90° angle relative to its axis.

It can be seen that the pressure check gauge of the present invention provides a variety of advantages over conventional refrigerant pressure check devices. First, the device of the present invention is specially designed to be installed and left in place on the low pressure service valve fitting. Accordingly, the possibility of losing the device during periods of storage thereof remote from the test and service valve fitting is essentially eliminated. Further, since the device is designed as an in-place test fitting, the number of times that it needs to be connected to and removed from the service valve fitting is concomitantly reduced, thereby to a great extent overcoming the sometimes difficult and awkward access and connection problems associated with conventional, temporarily connected pressure check devices. The in-place pressure check device of the present invention is also quite compact and inexpensive to produce, and gives rapid, accurate refrigerant pressure readings simply by removing the closure cap.

DETAILED DESCRIPTION

Figures 1, 2, 3:
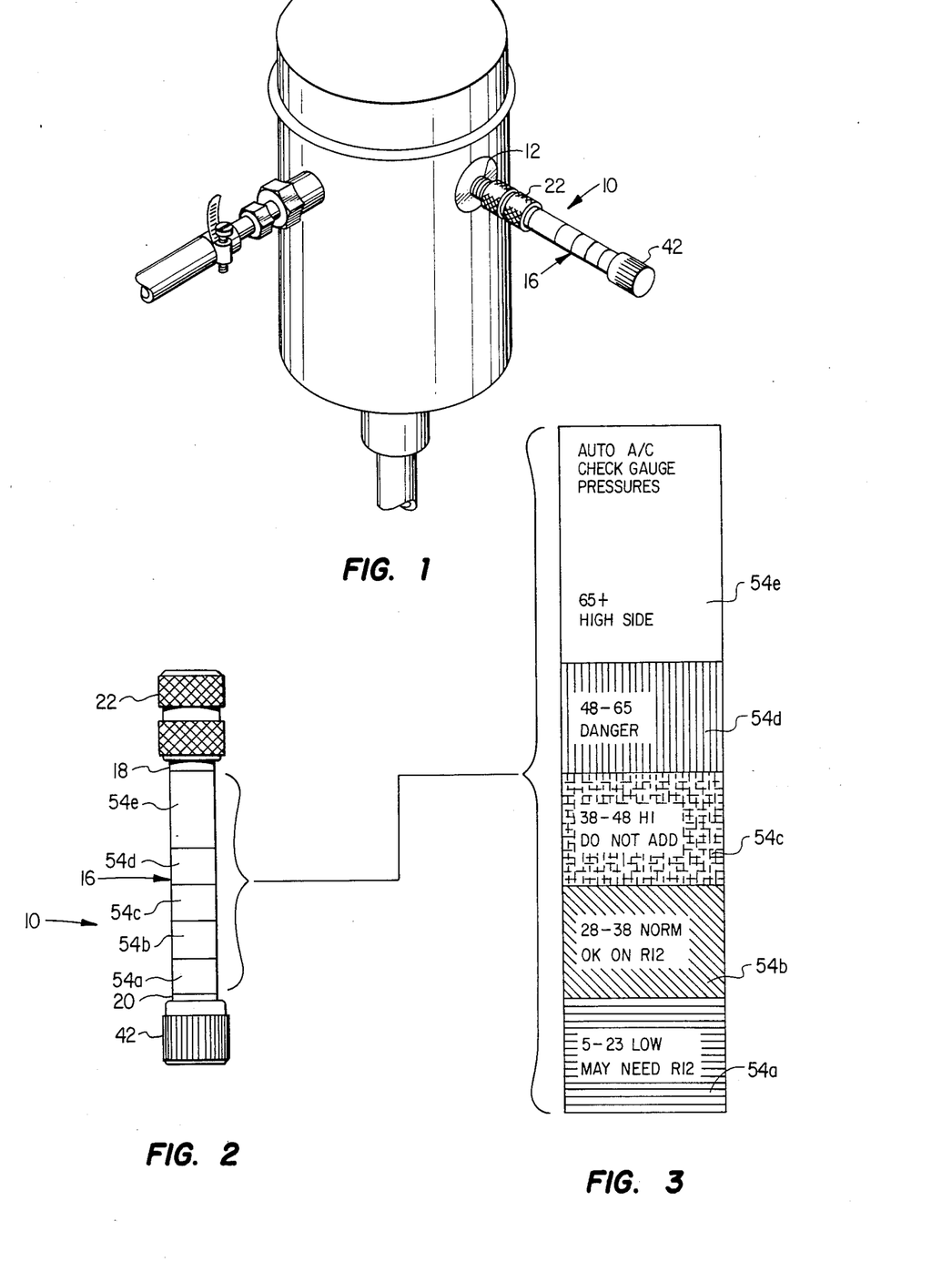
FIG. 1 is a perspective view of the low pressure side accumulator portion of a car air conditioning system refrigerant circuit with a removable, in-place pressure check gauge of the present invention shown connected to the low pressure refrigerant test and service valve fitting on the accumulator.
FIG. 2 is an enlarged scale side elevational view of the pressure check gauge.
FIG. 3 is an enlarged scale detail view of a colored pressure zone indicia area imprinted on the exterior side surface of the hollow cylindrical body of the gauge.

Illustrated in FIGS. 1 and 2 is a refrigerant pressure check gauge 10 which embodies principles of the present invention and is removably connectable in a manner subsequently described to the low pressure test and service valve fitting 12 in the refrigerant circuit of a car air conditioning system, and is utilized to periodically check the refrigerant pressure in such system. For purposes of illustration, the valve fitting 12 is shown as being associated with the suction accumulator portion 14 of the air conditioning circuit. However, the location of the valve fitting 12 can vary from system to system, and might be alternatively located on the suction side of the refrigerant compressor, in the suction line extending between the evaporator and the compressor, on the P.O.A. valve or on the V.I.R. valve portion of the refrigerant circuit. As will be seen, the gauge 10 is of a compact configuration and is specially constructed to permit it to remain in place on the valve fitting 12, thereby eliminating the conventional necessity of repeatedly connecting and disconnecting a pressure check device each time a refrigerant pressure reading is desired. Additionally, because the gauge 10 is designed to remain in place on the valve fitting 12, the possibility of misplacing the gauge during idle periods thereof is essentially eliminated.

Figure 4:
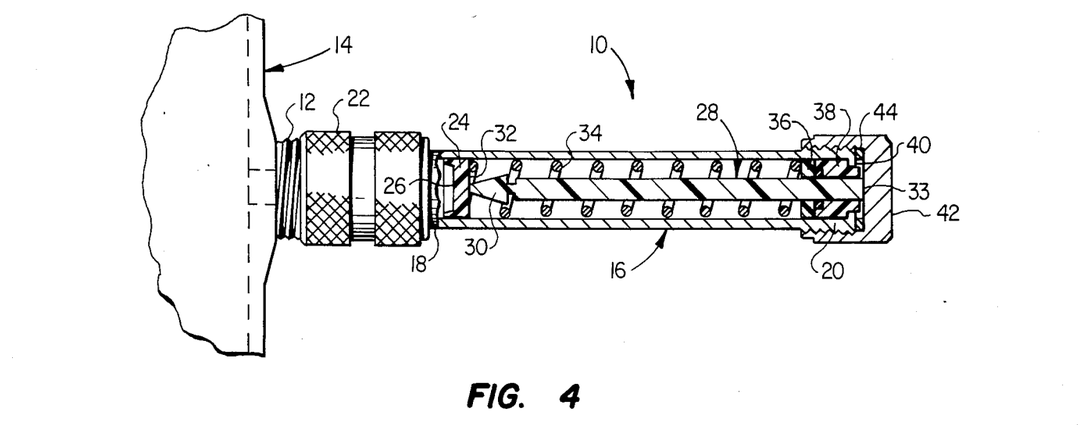
FIG. 4 is a fragmentary, partially sectioned side elevational view of the pressure check gauge connected to the test and service valve fitting with the closure cap of the gauge in place.
Figure 5:
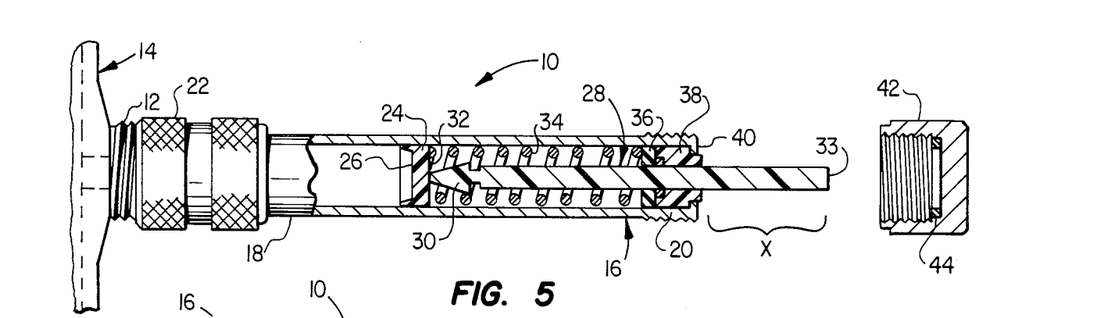
FIG. 5 is a view similar to that in FIG. 4, but with the closure cap removed.

Referring now to FIGS. 2, 4 and 5, the pressure check gauge 10 of the present invention includes an elongated hollow cylindrical metal body 16 having an inner end 18, and an outer end 20. Coaxially and fixedly secured to the inner body end 18 is a hollow cylindrical, internally threaded connection fitting 22 which is threadably connected to and over the test and service valve fitting 12. The fitting 22 is of conventional construction and has a central pin portion (not illustrated) which engages a spring-loaded, normally closed valve element within the valve fitting 12 to hold it open and thereby admit pressurized refrigerant into the gauge body 16 through its inner end 18. Removal of the connection fitting 22 from the valve fitting 12 permits its internal valve element to be automatically returned to its normally closed position.

A generally cylindrical elastomeric seal element 24 is slidingly received within the interior of the gauge body 16 and is movable toward the outer body end 20 by refrigerant pressure acting upon its left end surface 26. The elastomeric element 24 thus defines within the gauge body 16 a sliding seal which prevents the passage of pressurized refrigerant into the portion of the body disposed rightwardly of the element 24.

Coaxially disposed within the gauge body 16 is an elongated plastic pressure indicator rod 28 having, along most of its length, a square cross-section. A generally conically shaped inner end 30 of the rod 28 is engageable by the right end surface 32 of the sliding seal element 24 so that during refrigerant pressure-caused rightward movement of the seal element the pressure indicator rod 28 is moved by the seal element from a retracted position (FIG. 4) within the gauge body 16 to an extended position (FIG. 5) in which the outer end 33 of the rod 28 is moved outwardly through the outer end 20 of the gauge body 16 to an extent "X" indicative of the refrigerant pressure being checked.

Rightward movement of the sliding seal element 24 is resisted by a cylindrical coiled compression spring element 34 coaxially received within the gauge body 16 and circumscribing the pressure indicator rod 28. A left end of the spring 34 is suitably secured to the sliding seal element 24, while the right end of the spring bears against a cylindrical plastic guide member 36 which is slidingly received within the interior of the gauge body 16 and has a central rectangular opening through which the pressure indicator rod 28 extends. Guide member 36 bears in turn against a cylindrical friction guide member 38 which is captively retained within the body 16 by an inturned lip portion 40 formed around the outer body end 20, and has a rectangular central opening which receives the pressure indicator rod 28. The elements 24, 28, 34, 36 and 38 are of generally conventional construction and are similar to those utilized in "pop-out" pressure gauges such as those used as tire pressure gauges. However, these elements in the present invention are considerably smaller than those found in conventional pressure check gauges so that the gauge 10 is considerably more compact than conventional popout type, temporarily connectable pressure check gauges.

As may be seen by comparing FIGS. 4 and 5, the pressure indicator rod 28 is movable axially of the gauge body 16 between a retracted position (FIG. 4) in which the rod 28 is disposed essentially entirely within the body 16, and an extended position in which the outer end 33 of the rod 28 is moved outwardly through the open outer end 20 of the gauge body 16. According to a unique aspect of the present invention, an internally threaded, cylindrical closure cap 42 is provided which may be externally threaded onto the open outer end 20 of the gauge body 16. As best illustrated in FIG. 4, the closure cap 42 in its installed position performs several useful functions. First, it serves to prevent the entry of dust, dirt and the like into the interior of the gauge body 16. Secondly, the cap 42, by means of an annular seal element 44 which is carried therein and engages the outer end 20 of the gauge body, forms a seal at the outer body end to prevent leakage therethrough of refrigerant which may be bypassing the sliding seal element 24 in the event that it becomes worn. The cap seal 44 thus serves as a backup to the sliding seal element 24. Thirdly, the cap 42 functions to engage the outer end 33 of the pressure indicator rod 28 to retain the rod in its retracted position within the gauge body 16 against the rightwardly directed refrigerant pressure force exerted on the rod via the sliding seal element 24.

To initially connect the pressure check gauge 10 to the test and service valve fitting 12, the closure cap 42 is first screwed onto the outer end 20 of the gauge body 16, and the connection fitting 22 is then screwed onto the valve fitting 12 to maintain its normally closed internal valve element in a continuously open position as previously described. The gauge 10 may then be conveniently left in this installed and self-supporting position until it is desired to check the refrigerant pressure within the accumulator 14 or other refrigerant circuit portion upon which the valve fitting 12 may be disposed.

To rapidly check such refrigerant pressure, all that is necessary is to remove the closure cap 42 as illustrated in FIG. 5. Upon removal of the cap 42, the refrigerant pressure within the gauge body 16 to the left of the sliding seal element 24 drives the seal rightwardly within the gauge body to force a portion of the pressure indicator rod 28 outwardly through the open outer end 20 of the gauge body. Such rightward movement of the sliding seal element 24 is, of course, resisted by the increasing compression of the spring element 34. When the leftward resistive force of the compressed spring element 34 on the seal element 24 equals the rightward pressure force thereon, the rightward movement of the rod 28 ceases, with the outwardly projecting portion X of the rod 28 being proportional to the refrigerant pressure.

The rapid visual observation of the refrigerant pressure within the gauge body 16 to the left of the sliding seal element 24 is facilitated by the imprintation on the four sides 46, 48, 50 and 52 of the pressure indicator rod 28 of various pressure-related and other informational indicia. Specifically, with reference now to FIGS. 6 and 7, the words "A/C check gauge" are imprinted longitudinally along the rod side surface 46. Printed along the opposite side surfaces 48 and 52 of the rod are numerical pressure values (in psi) which increase from adjacent the outer end 32 of the rod toward its inner end 30. The actual refrigerant pressure may thus be readily ascertained simply by observing at what point along one of these numerical pressure scale side surfaces 48 and 52 the outer end 20 of the gauge body 16 falls.

Figure 6:
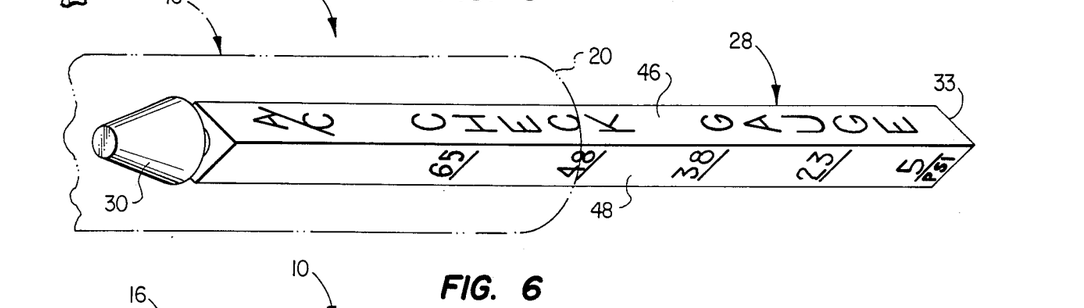
FIG. 6 is a simplified corner side elevational view of a rectangularly cross-sectioned pressure indicator rod portion of the gauge in an extended position relative to the gauge body, a portion of which is illustrated in phantom, certain internal components of the gauge having been removed for illustrative purposes.
Figure 7:
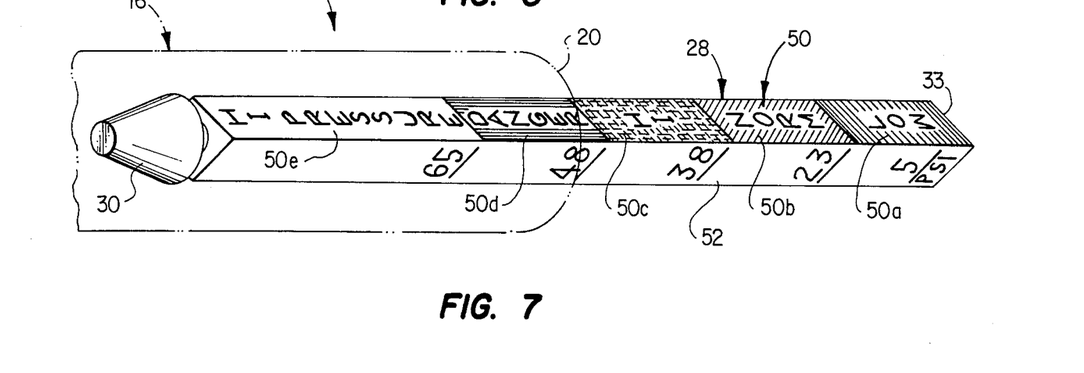
FIG. 7 is a view similar to that in FIG. 6, but with the pressure indicator rod rotated to show an opposite corner side portion thereof.

On the side surface 50 of the pressure indicating rod 28 are formed serially arranged, differently colored pressure zones which are somewhat more broadly indicative of the refrigerant pressure within the air conditioning system. Specifically, the rod side surface 50 is provided sequentially along its length, beginning adjacent the outer end 32 of the rod 28, with a blue colored zone $50_a$ with the word "LOW" therein, a green colored zone $50_b$ with the word "NORM" therein, a yellow colored zone $50_c$ with the word "HI" therein, a red colored zone $50_d$ with the word "DANGER" therein, and a somewhat longer white colored zone $50_e$ with the words "HI PRESSURE" therein. The general range of refrigerant pressure may thus be determined simply by observing in which of these various colored zones the outer end 20 of the gauge body 16 falls after the rod 28 has been moved to its extended position by refrigerant pressure after the closure cap 42 has been removed.

These colored rod zones correspond to somewhat larger, similarly arranged and colored zones $54_a$ through $54_e$ suitably imprinted on the exterior side surface of the gauge body 16. Referring now to FIGS. 2 and 3, it can be seen that the colored pressure zone portions $54_a$–$54_e$ on the gauge body contain additional information which conveniently supplements the information found on the colored pressure zones imprinted on the side surface 50 of the pressure indicator rod 28. Specifically, with reference to FIG. 3, it can be seen that the white body zone $54_a$ contains a specific pressure range, an indication that this is considered "low" and reminding the pressure reader that the air conditioning system at least potentially needs an additional charge of refrigerant. The green body zone 54$_b$ has imprinted thereon a higher numerical pressure range, an indication that this is a normal refrigerant pressure situation, and an indication that the air conditioning system is sufficiently charged. The yellow body zone 54$_c$ has a yet higher pressure range imprinted thereon, an indication that this pressure range is toward the high end of the acceptable refrigerant pressure, and also has an indication thereon that additional refrigerant should not be added. The red body zone 54$_d$ has a still higher numerical pressure range printed thereon and an indication that if the outer end 20 of the gauge body 16 falls within the corresponding red zone 50$_d$ on the indicator rod 28, a dangerously high refrigerant pressure exists. Finally, the white body zone 54$^e$ has printed thereon a general indication that the body indicia relates to auto air conditioning check gauge pressures, an indication that the pressures corresponding to the white body and indicator rod zones are above 65 psi, and a further indication that when the white zone appears on the indicator rod 28, the gauge 10 has not been properly connected to the low pressure service valve fitting, but has been improperly connected instead to the high pressure service valve fitting.

It can thus be seen that with the pressure indicator rod in its extended, pressure indicating position representatively illustrated in FIGS. 5, 6 and 7, the information appearing on the rod side surfaces can be very quickly interpreted simply by referring to the augmented on the exterior side surface indicia on the gauge body. In this manner, both the specific refrigerant pressure, and the overall general state of such pressure may be quickly verified.

After the pressure reading has been taken in the previously described fashion, the rod 28 may be manually pushed back to its retracted position (using the cap 42) and the closure cap 42 reinstalled on the gauge body end 20 to reseal the body and retain the indicator rod 28 in its retracted or re-set position within the body until it is necessary to take a subsequent refrigerant pressure reading.

It can be seen from the foregoing that the pressure check gauge 10 uniquely solves a variety of problems typically associated with conventional, temporarily connectable pressure check gauge apparatus. Since the gauge 10 is quite compact in size, and is adapted to remain connected to the valve fitting 12 between refrigerant pressure checks, it is quite easy to install and additionally is unlikely to be lost between pressure checks since it is always positioned in precisely the location at which it is needed.

In the event that the gauge 10 indicates that additional refrigerant is needed, it may be temporarily removed from the service valve fitting 12 so that additional refrigerant can be added through the now exposed valve fitting 12. After this additional refrigerant has been added, the pressure check gauge 10 is simply reconnected to the fitting 12 as previously described and again left in place until needed.

To prevent engine vibration from loosening the connection between the connection fitting 22 and the valve fitting 12, and the connection between the gauge body end 20 and the closure cap 42, the threads on the connection fitting, the gauge body and the closure cap may be given a suitably angled, relatively deep configuration.

As can be seen in FIGS. 1, 4 and 5, the connection fitting 22 secures the gauge body 16 to the test and service valve fitting 12 in a coaxial relationship therewith so that the gauge body extends horizontally outwardly from the accumulator 14. In some instances, however, this essentially coaxial gauge body positioning may be impractical due to space limitations within the engine compartment. To overcome this potential space limitation problem, an alternate, angled embodiment 10$_a$ of the gauge 10 is provided in which the installed gauge body 16 extends at a 90° angle to the axis of the valve fitting 12.

Figure 8:
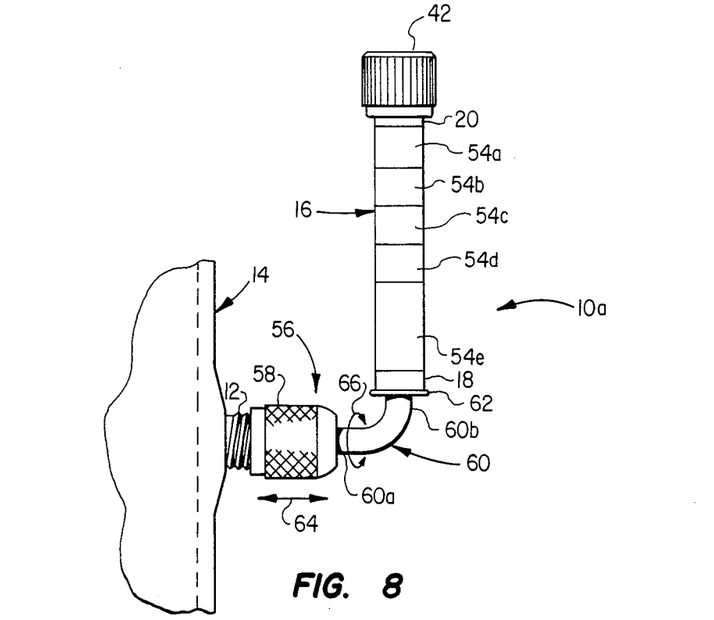
FIG. 8 is a side elevational view of an alternate, angled embodiment of the pressure check gauge operatively connected to the accumulator refrigerant test and service valve fitting, with the gauge body closure cap in place.

Referring now to FIG. 8, the valve fitting connection means on the angled gauge 10$_a$ comprise a generally conventional angled swivel fitting 56 secured to the inner end 18 of the gauge body 16. Fitting 56 includes a hollow cylindrical, internally threaded connection member 58 which is threadable onto the valve fitting 12. The connection member 58 is captively retained on an inner end portion 60$_a$ of a hollow metal tube 60 which is bent at 90° and has an outer end portion 60$_b$ that is secured to a suitable cap or insert member 62 on the gauge body end 18 and communicates with the interior of the gauge body.

As respectively indicated by the double-ended arrows 64 and 66 in FIG. 8, the connection member 58, until tightened onto the valve fitting 12, is movable along and around the inner end portion 60$_a$ of tube 60. However, when the connection member 58 is tightened on the valve fitting 12, tube portion 60$_a$ becomes frictionally locked to thereby prevent translation or rotation of the tube 60 and the gauge body 16 to which its outer end is secured. In a conventional manner, the inner end of tube 60 (within the connection member 58) is provided with an end fitting (not shown) which simultaneously holds the internal valve mechanism in the fitting 12 in an open position and admits pressurized refrigerant into the gauge body 16 via the interior of the tube 60.

In installing the angled gauge 10$_a$ on the valve fitting 12, the gauge body 16 is simply held in a desired rotational orientation about the axis of fitting 12 while the connection member is screwed onto fitting 12 to frictionally lock the body 16 in its held orientation. The body 16 may thus be mounted in a vertically upwardly extending orientation, a vertically downwardly extending orientation, or any other desired angular position between these two orientations relative to the axis of valve fitting 12. While the tube 60 has been illustratively depicted as being bent at 90°, it will be readily appreciated that it could be bent at other angles to change the overall angle of gauge 10$_a$.

Figure 9:
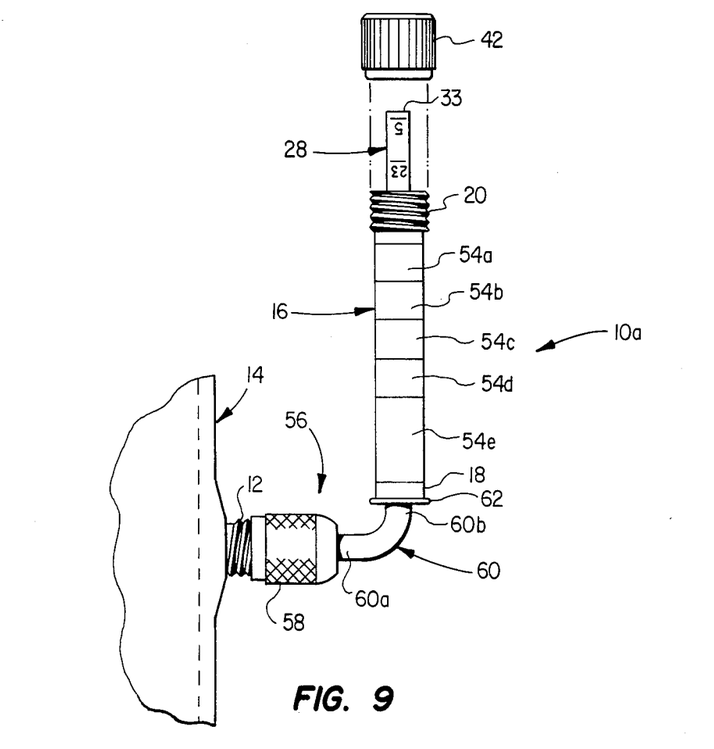
FIG. 9 is a view similar to that in FIG. 8, but with the gauge body closure cap removed.

Except for the provision of the angled swivel fitting 56, the gauge 10$_a$ is structurally and operationally identical to the previously described gauge 10. Once the in-place gauge 10$_a$ is installed, all that is necessary to check the refrigerant pressure is to remove the closure cap 42 (FIG. 9), read the pressure from the popped-out indicator rod 28, and then replace the cap 42 as shown in FIG. 8.

A variety of modifications could be made to the gauges 10 and 10$_a$ if desired. For example, a wide variety of alternate corresponding gauge body and indicator rod pressure level and zone indications could be utilized. Moreover, while the gauges 10 and 10$_a$ of the present invention are particularly useful in conjunction with car air conditioning systems, they could be easily modified for use in other fluid pressure check applications such as, for example, on home or commercial building air conditioning systems.

The foregoing detailed description is to be clearly understood as being given by way of illustration and example only, the spirit and scope of the present invention being limited solely by the appended claims.

What is claimed is:

1. A fluid pressure check gauge comprising:

a hollow body having first and second openings therein;

connection means, secured to said body at said first opening, for removably mounting and supporting said body on a test fitting on a pressurized fluid circuit for extended periods of time, and for communicating the interior of said body with pressurized fluid in said circuit through said test fitting;

pressure indicator means, carried within said body, for providing a visual indication of the pressure of the fluid within said circuit, said pressure indicating means including a pressure indicating member movable outwardly through said second opening by pressurized fluid within said body to a variably extended position indicative of the fluid pressure within said circuit, and manually movable back into said body to a retracted position therein; and closure means securable to said body to cover and seal said second opening and to engage said pressure indicating member and hold it in said retracted position within said body against the force of said pressurized fluid exerted upon said pressure indicating member and tending to drive it outwardly through said second opening, said closure means being removable from said body to permit said pressure indicating member to be pressure-driven to a pressure-indicative extended position thereof in response to removal of said closure means from said body.

2. The fluid pressure check gauge of claim 1 wherein:

said hollow body has an elongated cylindrical configuration with first and second ends which respectively define said first and second openings, said pressure indicating member is an elongated rod member coaxially carried within said body, said connection means include a hollow connection fitting operatively secured to said first end of said body, and said closure means include a cap member removably securable to said second end of said body, and seal means for forming a seal between said cap member and said second end of said body.

3. The fluid pressure check gauge of claim 2 wherein:

said connection fitting is a hollow cylindrical, internally threaded connection member coaxially and fixedly secured to said first end of said body.

4. The fluid pressure check gauge of claim 2 wherein said pressure indicator means include:

a seal member slidingly carried in said body and movable toward said second end thereof by pressurized fluid entering said body through said first end thereof, said seal member being adapted to engage an inner end portion of said rod member and move said rod member toward an extended position thereof, and spring means, carried within said body, for biasing said seal member toward said first end of said body.

5. The fluid pressure check gauge of claim 1 wherein:

said pressure indicating member has pressure indicia markings thereon for facilitating the visual determination of the fluid pressure when said pressure indicating member is in an extended position.

6. The fluid pressure check gauge of claim 5 wherein:

said pressure indicia markings include a series of numerical pressure markings.

7. The fluid pressure check gauge of claim 5 wherein:

said pressure indicia markings include a series of differently colored zone markings each indicative of a different pressure operating range of said pressurized fluid.

8. A fluid pressure check gauge comprising:

a hollow body having first and second openings therein;

connection means, secured to said body at said first opening, for removably mounting and supporting said body on a test fitting on a pressurized fluid circuit for extended periods of time, and for communicating the interior of said body with pressurized fluid in said circuit through said test fitting;

pressure indicator means, carried within said body, for providing a visual indication of the pressure of the fluid within said circuit, said pressure indicating means including a pressure indicating member movable outwardly through said second opening by pressurized fluid within said body to a variably extended position indicative of the fluid pressure within said circuit, and manually movable back into said body to a retracted position therein; and closure means securable to said body to cover and seal said second opening, and retain said pressure indicating member in said retracted position within said body, and removable from said body to permit said pressure indicating member to be pressure-driven to a pressure-indicative extended position thereof, said hollow body having an elongated cylindrical configuration with first and second ends which respectively define said first and second openings, said pressure indicating member being an elongated rod member coaxially carried within said body, said connection means including a hollow connection fitting operatively secured to said first end of said body, said closure means including a cap member removably securable to said second end of said body, and seal means for forming a seal between said cap member and said second end of said body, said connection means comprising an angled swivel fitting in which said connection fitting is movably and captively retained on a first end portion of a bent, hollow tubular member having a second end portion secured to said first end of said body.

9. A fluid pressure check gauge comprising:

a hollow body having first and second openings therein;

connection means, secured to said body at said first opening, for removably mounting and supporting said body on a test fitting on a pressurized fluid circuit for extended periods of time, and for communicating the interior of said body with pressurized fluid in said circuit through said test fitting;

pressure indicator means, carried within said body, for providing a visual indication of the pressure of the fluid within said circuit, said pressure indicating means including a pressure indicating member movable outwardly through said second opening by pressurized fluid within said body to a variably extended position indicative of the fluid pressure within said circuit, and manually movable back into said body to a retracted position therein; and closure means securable to said body to cover and seal said second opening, and retain said pressure indicating member in said retracted position within said body, and removable from said body to permit said pressure indicating member to be pressure-driven to a pressure-indicative extended position thereof, said pressure indicating member having pressure indicia markings thereon for facilitating the visual determination of the fluid pressure when said pressure indicating member is in an extended position, said pressure check gauge further comprising pressure reference indicia markings on said body which are correlated in a predetermined manner with said pressure indicia markings on said pressure indicating member.

10. Removable, in-place pressure check apparatus connectable to a self-closing pressure test valve fitting in a refrigerant circuit, comprising:

an elongated hollow body having first and second ends;

connection means secured to said first body end for removably connecting it to said pressure test valve fitting in a manner holding the test valve fitting open to admit pressurized refrigerant into said body through said first end thereof;

pressure indicator means carried in said body for movement outwardly through said second end thereof by refrigerant pressure within said body to an extended position indicative of such pressure, and manual movement back into said body against such pressure to a retracted position; and closure means, removably connectable to said second body end, for closing and sealing said second body end, and for holding said pressure indicator means in said retracted position within said body against the force of said pressurized refrigerant exerted upon said pressure indicator means and tending to force the same outwardly through said second body end, whereby said pressure check apparatus may be left in place on said pressure test valve fitting with said closure means connected to said second body end, and the refrigerant pressure periodically checked simply by removing said closure means, observing the distance which said pressure indicator means are moved outwardly through said second body end by pressurized refrigerant within said body in response to removal of said closure means, and then manually moving said pressure indicator means back into said body and replacing said closure means to reseal said second body end and captively retain said pressure indicator means in said retracted position thereof within said body until a subsequent refrigerant pressure reading is desired.

11. The pressure check apparatus of claim 10 wherein:

said connection means include an internally threaded, hollow cylindrical connection member coaxially and fixedly secured to said first end of said body.

12. The pressure check apparatus of claim 10 wherein:

said closure means include a cap member removably securable to said second body end, and seal means for forming a pressure tight seal between said cap member and said second body end.

13. The pressure check apparatus of claim 10 wherein said pressure indicator means include:

a seal member slidingly carried in said body and movable toward said second end thereof by pressurized refrigerant entering said body through said first end thereof, and an elongated pressure indicating member coaxially carried within said body and being axially movable through said second body end to said extended position by movement of said seal member toward said second body end.

14. The pressure check apparatus of claim 13 wherein said pressure indicating means further include:

spring means carried within said body for biasing said seal member toward said first body end.

15. The pressure check apparatus of claim 10 wherein:

said pressure indicator means include an elongated rod member coaxially carried within said body and axially movable outwardly through said second body end to said extended position, and said apparatus further comprises pressure indicia markings positioned on a side surface portion of said rod member for facilitating the visual determination of the refrigerant pressure when said rod member is in said extended position.

16. The pressure check apparatus of claim 15 wherein:

said pressure indicia markings include a series of numerical pressure markings.

17. The pressure check apparatus of claim 15 wherein:

said pressure indicia markings include a series of differently colored zone markings each indicative of a different operating pressure range of the refrigerant.

18. Removable, in-place pressure check apparatus connectable to a self-closing pressure test valve fitting in a refrigerant circuit, comprising:

an elongated hollow body having first and second ends;

connection means secured to said first body end for removably connecting it to said pressure test valve fitting in a manner holding the test valve fitting open to admit pressurized refrigerant into said body through said first end thereof;

pressure indicator means carried in said body for movement outwardly through said second end thereof by refrigerant pressure within said body to an extended position indicative of such pressure, and manual movement back into said body against such pressure to a retracted position; and closure means, removably connectable to said second body end, for closing and sealing said second body end, and for holding said pressure indicator means in said retracted position within said body, whereby said pressure check apparatus may be left in place on said pressure test valve fitting with said closure means connected to said second body end, and the refrigerant pressure periodically checked simply by removing said closure means, observing the distance which said pressure indicator means are moved outwardly through said second body end by pressurized refrigerant within said body, and then manually moving said pressure indicator means back into said body and replacing said closure means to reseal said second body end and hold said pressure indicator means in said retracted position thereof within said body, said connection means including an angled swivel fitting having an internally threaded, hollow cylindrical connection member movably and captively retained on a first end portion of a bent, hollow tubular member having a second end portion secured to said first end of said body.

19. The pressure check apparatus of claim 18 wherein:

said hollow tubular member is bent at an angle of approximately 90°.

20. Removable, in-place pressure check apparatus connectable to a self-closing pressure test valve fitting in a refrigerant circuit, comprising:

an elongated hollow body having first and second ends;

connection means secured to said first body end for removably connecting it to said pressure test valve fitting in a manner holding the test valve fitting open to admit pressurized refrigerant into said body through said first end thereof;

pressure indicator means carried in said body for movement outwardly through said second end thereof by refrigerant pressure within said body to an extended position indicative of such pressure, and manual movement back into said body against such pressure to a retracted position; and closure means, removably connectable to said second body end, for closing and sealing said second body end, and for holding said pressure indicator means in said retracted position within said body, whereby said pressure check apparatus may be left in place on said pressure test valve fitting with said closure means connected to said second body end, and the refrigerant pressure periodically checked simply by removing said closure means, observing the distance which said pressure indicator means are moved outwardly through said second body end by pressurized refrigerant within said body, and then manually moving said pressure indicator means back into said body and replacing said closure means to reseal said second body end and hold said pressure indicator means in said retracted position thereof within said body, said pressure indicator means including an elongated rod member coaxially carried within said body and axially movable outwardly through said second body end to said extended position, said apparatus further comprising pressure indicia markings positioned on a side surface portion of said rod member for facilitating the visual determination of the refrigerant pressure when said rod member is in said extended position, said apparatus further comprising pressure reference indicia markings on said body which are correlated in a predetermined manner with said pressure indicia markings on said rod member.

21. The pressure check apparatus of claim 20 wherein said pressure indicia markings on said rod member and said pressure reference indicia markings on said body each include:

numerical pressure markings, and a series of differently colored zone markings each indicative of a different operating pressure range of the refrigerant.

22. A method of periodically checking the refrigerant pressure in an air conditioning circuit having a self-closing test valve fitting, said method comprising the steps of:

providing a pressure check gauge having a body with first and second ends, a connection fitting secured to said first end and removably connectable to said test valve fitting in a manner holding it open to admit pressurized refrigerant into said body through said first end, a pressure indicating member carried within said body and movable by pressurized refrigerant therein outwardly through said second body end to an extent indicative of the pressure of such refrigerant, and a cap member removably connectable to said second body end to seal the same and to engage said pressure indicating member and hold it in a retracted position within said body against the outward driving force imposed on said pressure indicating member by the pressurized refrigerant in said body;

operatively securing said connection fitting to said test valve fitting to mount and support said pressure check gauge thereon;

operatively securing said cap member to said second end of said body;

checking the refrigerant pressure by removing said cap member, permitting refrigerant pressure within said body to drive said pressure indicating member outwardly through said second body end in response to removal of said cap member, and then observing the distance that said pressure indicator member projects outwardly from said second body end;

pushing said pressure indicator member back into said body;

replacing said cap member to reseal said second body end and to again engage and retain said pressure indicating member in a retracted position within said body; and then leaving said pressure check gauge in a mounted position on said test valve fitting in readiness for a subsequent refrigerant pressure check.

23. The method of claim 22 wherein:

said method further comprises the step of forming refrigerant pressure indicia markings on said pressure indicating member, and said observing step is performed by observing the relationship between said second body end and said refrigerant pressure indicia markings to determine the refrigerant pressure level.

24. A method of periodically checking the refrigerant pressure in an air conditioning circuit having a self-closing test valve fitting, said method comprising the steps of:

providing a pressure check gauge having a body with first and second ends, a connection fitting secured to said first end and removably connectable to said test valve fitting in a manner holding it open to admit pressurized refrigerant into said body through said first end, a pressure indicating member carried within said body and movable by pressurized refrigerant therein outwardly through said second body end to an extent indicative of the pressure of such refrigerant, and a cap member removably connectable to said second body end to seal the same and to hold said pressure indicating member in a retracted position within said body;

forming refrigerant pressure indicia markings on said pressure indicating member;

forming refrigerant pressure reference indicia markings on said body which are correlated in a predetermined manner with said refrigerant pressure indicia markings on said pressure indicating member;

operatively securing said connection fitting to said test valve fitting to mount and support said pressure check gauge thereon;

operatively securing said cap member to said second end of said body;

checking the refrigerant pressure by removing said cap member, permitting refrigerant pressure within said body to drive said pressure indicating member outwardly through said second body end, and then observing the distance that said pressure indicating member projects outwardly from said second body end, said observing step being performed by observing the relationship between said second body end and said pressure level indicia markings to determine the refrigerant pressure level, and comparing a portion of said indicia markings on said pressure indicating member adjacent said second body end to a corresponding portion of said reference indicia markings on said body;

pushing said pressure indicator member back into said body;

replacing said cap member to reseal said second body end and to retain said pressure indicating member in a retracted position within said body; and then leaving said pressure check gauge in a mounted position on said test valve fitting in readiness for a subsequent refrigerant pressure check.

25. The method of claim 24 wherein said steps of forming pressure indicia markings on said pressure indicating member and said body are performed by:

forming corresponding numerical pressure markings on said pressure indicating member and said body, and forming corresponding series of differently colored zone markings on said pressure indicating member and said body, the zones in each series thereof being indicative of different operating pressure ranges of the refrigerant.

* * * * *